United States Patent
Satkowski et al.

(10) Patent No.: US 7,301,000 B2
(45) Date of Patent: Nov. 27, 2007

(54) NUCLEATING AGENTS FOR POLYHYDROXYALKANOATES

(75) Inventors: Michael Matthew Satkowski, Oxford, OH (US); James Terry Knapmeyer, Cincinnati, OH (US); David Patrick Kreuzer, Fairfield, OH (US)

(73) Assignee: The Procter & Gamble Company, Cincinnati, OH (US)

(*) Notice: Subject to any disclaimer, the term of this patent is extended or adjusted under 35 U.S.C. 154(b) by 0 days.

(21) Appl. No.: 11/224,805

(22) Filed: Sep. 13, 2005

(65) Prior Publication Data
US 2006/0058498 A1 Mar. 16, 2006

Related U.S. Application Data

(60) Provisional application No. 60/610,117, filed on Sep. 15, 2004.

(51) Int. Cl.
*C08G 63/02* (2006.01)
(52) U.S. Cl. ............... 528/272; 264/176.1; 264/212; 264/239; 264/291; 264/330; 264/464; 524/81; 524/86; 524/186; 524/233; 525/437; 525/450; 525/540
(58) Field of Classification Search ......... 264/464, 264/176.1, 239, 212, 291, 330; 525/437, 525/450, 540; 524/81, 86, 186, 233; 528/272
See application file for complete search history.

(56) References Cited

U.S. PATENT DOCUMENTS

| | | | |
|---|---|---|---|
| 4,835,203 A | 5/1989 | Sieverding | |
| 5,068,274 A | 11/1991 | Efner | |
| 5,523,342 A | 6/1996 | Nagaoka et al. | |
| 5,973,100 A * | 10/1999 | Asrar et al. | 528/176 |
| 6,706,942 B1 * | 3/2004 | Zhao et al. | 604/364 |
| 2002/0002252 A1 | 1/2002 | Obuchi et al. | |
| 2002/0128344 A1 | 9/2002 | Fujihira et al. | |
| 2004/0157967 A1 | 8/2004 | Ito | |
| 2004/0214983 A1 | 10/2004 | Tobita et al. | |

FOREIGN PATENT DOCUMENTS

| | | |
|---|---|---|
| EP | 0 467 368 A2 | 1/1992 |
| JP | 06-299054 | 4/1993 |
| JP | 6-299054 * | 10/1994 |
| JP | 07-188537 | 7/1995 |
| JP | 7-188537 * | 7/1995 |
| JP | 08-027363 | 1/1996 |
| JP | 11-005849 | 1/1999 |
| JP | P2004-149692 A | 5/2004 |

OTHER PUBLICATIONS

International Search Report mailed Dec. 12, 2005, 5 pages.

* cited by examiner

*Primary Examiner*—Terressa Boykin
(74) *Attorney, Agent, or Firm*—Armina E. Matthews; Kim William Zerby

(57) ABSTRACT

The present invention provides a process for crystallizing a polymer having at least 20 mole percent of hydroxyalkanoate repeat units, comprising admixing the polymer and a compound of the formula $R^1-C(O)N(R^2)_2$, $R^1-C(O)NH-(R^3)-NHC(O)-R^1$, $R^1-NHC(O)NH-(R^3)-NHC(O)NH-R^1$, $R^1-NHC(O)-R^2$, $R^1-NHC(O)-(R^3)-C(O)NH-R^1$, $R^1-C(O)NH-(R^3)-C(O)NH-R^1$, $R^1-NHC(O)NH-(R^3)-C(O)NH-R^1$, $R^1-NHC(O)NH-(R^3)-NHC(O)-R^1$, or a combination thereof, at a first temperature, which is from about 5° C. to about 15° C. above the melting point of the polymer; and cooling the polymer at a second temperature, which is from about the glass transition temperature of the polymer to about the melting point of the compound. The present invention also provides a composition comprising a polymer having at least about 20 mole percent of hydroxyalkanoate repeat units, and a compound of the formula $R^1-C(O)N(R^2)_2$, $R^1-C(O)NH-(R^3)-NHC(O)-R^1$, $R^1-NHC(O)NH-(R^3)-NHC(O)NH-R^1$, $R^1-NHC(O)-R^2$, $R^1-NHC(O)-(R^3)-C(O)NH-R^1$, $R^1-C(O)NH-(R^3)-C(O)NH-R^1$, $R^1-NHC(O)NH-(R^3)-C(O)NH-R^1$, $R^1-NHC(O)NH-(R^3)-NHC(O)-R^1$, or a combination thereof.

34 Claims, No Drawings

NUCLEATING AGENTS FOR POLYHYDROXYALKANOATES

CROSS REFERENCE TO RELATED APPLICATIONS

This application claims the benefit of U.S. Provisional Application No. 60/610,117 filed Sep. 15, 2004.

FIELD OF THE INVENTION

This invention relates to methods and compositions that are useful for increasing the crystallization rate or processing speed of polyhydroxyalkanoate polymers.

BACKGROUND OF THE INVENTION

Plastics such as polyesters are typically produced from petrochemical sources by well-known synthetic means. These petrochemical-based polymers can take centuries to degrade after disposal. Concern over plastic waste accumulation in the environment has resulted in a recent movement toward using biodegradable polymers instead.

Bio-based biodegradable polymers, also commonly referred to as "bioplastics," have not enjoyed great success in the marketplace due to their high production cost. However, advances in biotechnology have led to less expensive methods for their production. In one instance, biodegradable aliphatic copolyesters are now often produced by large-scale bacterial fermentation. Collectively termed polyhydroxyalkanoates, also known as "PHAs", these polymers can be synthesized from plant or bacteria fed with a particular substrate, such as glucose, in a fermentation plant. In many instances, the structural or mechanical properties of PHAs can be customized to fit the specifications of the desired end product. PHAs can degrade both aerobically and anaerobically.

PHAs are enormously versatile, and as many as 100 different PHA structures have been identified. PHA structures can vary in two ways. First, PHAs can vary according to the structure of the pendant groups, which are typically attached to a carbon atom having (D)-stereochemistry. The pendant groups form the side chain of hydroxyalkanoic acid not contributing to the PHA carbon backbone. Second, PHAs can vary according to the number and types of units from which they are derived. For example, PHAs can be homopolymers, copolymers, terpolymers, or higher combinations of monomers. These variations in PHA structure can cause variations in their physical characteristics. These physical characteristics allow PHAs to be used for a number of products that may be commercially valuable.

PHAs can be processed to produce articles for consumer use. Thermoplastic polymers including PHA can be transformed into articles for consumer use by first melting the polymer, shaping the molten polymer, and finally solidifying the polymer, normally by crystallization. Accordingly, crystallization rate is an important parameter that can control the rate of processing of PHA polymers. As a general rule, the faster the PHA can be crystallized, the faster the polymer can be processed. In addition, certain polymer forming processes including film blowing and melt fiber spinning may be difficult to perform in a practical manner if the crystallization does not occur fast enough. In these cases, the molten polymer is shaped in a way that is stable only over a short period of time. If crystallization does not occur within the necessary time frame, the process can be unsuccessful. Therefore, in some cases, the speed of crystallization weighs heavily on whether certain polymer processes are practical.

Therefore, there is a need for rapid processes and reagents that are useful for crystallizing PHA polymers. Such processes and reagents can be efficient, cost-saving, and suitable to large-scale processing of PHA materials.

SUMMARY OF THE INVENTION

The present invention provides a process for crystallizing a polymer having at least 20 mole percent of hydroxyalkanoate repeat units, comprising admixing the polymer and a compound of the formula $R^1$—C(O)N($R^2$)$_2$, $R^1$—C(O)NH—($R^3$)—NHC(O)—$R^1$, $R^1$—NHC(O)NH—($R^3$)—NHC(O)NH—$R^1$, $R^1$—NHC(O)—$R^2$, $R^1$—NHC(O)—($R^3$)—C(O)NH—$R^1$, $R^1$—C(O)NH—($R^3$)—C(O)NH—$R^1$, $R^1$—NHC(O)NH—($R^3$)—C(O)NH—$R^1$, $R^1$—NHC(O)NH—($R^3$)—NHC(O)—$R^1$, or a combination thereof, at a first temperature, which is from about 5° C. to about 15° C. above the melting point of the polymer; and cooling the polymer at a second temperature, which is from about the glass transition temperature of the polymer to about the melting point of the compound; wherein each $R^1$ is independently $C_6$-$C_{30}$ alkyl; each $R^2$ is independently H or $C_1$-$C_{20}$ alkyl; and each $R^3$ is independently $C_2$-$C_{10}$ alkylene.

The present invention also provides a composition comprising a polymer having at least about 20 mole percent of hydroxyalkanoate repeat units, and a compound of the formula $R^1$—C(O)N($R^2$)$_2$, $R^1$—C(O)NH—($R^3$)—NHC(O)—$R^1$, $R^1$—NHC(O)NH—($R^3$)—NHC(O)NH—$R^1$, $R^1$—NHC(O)—$R^2$, $R^1$—NHC(O)—($R^3$)—C(O)NH—$R^1$, $R^1$—C(O)NH—($R^3$)—C(O)NH—$R^1$, $R^1$—NHC(O)NH—($R^3$)—C(O)NH—$R^1$, $R^1$—NHC(O)NH—($R^3$)—NHC(O)—$R^1$, or a combination thereof, wherein each $R^1$ is independently $C_6$-$C_{30}$ alkyl; each $R^2$ is independently H or $C_1$-$C_{20}$ alkyl; and each $R^3$ is independently $C_2$-$C_{10}$ alkylene.

DETAILED DESCRIPTION OF THE INVENTION

All percentages and ratios used herein are by weight of the total composition and all measurements are made at about 25° C., unless otherwise designated.

In one embodiment the invention provides a process for crystallizing a polymer having at least 20 mole percent of hydroxyalkanoate repeat units, comprising admixing the polymer and a compound of the formula $R^1$—C(O)N($R^2$)$_2$, $R^1$—C(O)NH—($R^3$)—NHC(O)—$R^1$, $R^1$—NHC(O)NH—($R^3$)—NHC(O)NH—$R^1$, $R^1$—NHC(O)—$R^2$, $R^1$—NHC(O)—($R^3$)—C(O)NH—$R^1$, $R^1$—C(O)NH—($R^3$)—C(O)NH—$R^1$, $R^1$—NHC(O)NH—($R^3$)—C(O)NH—$R^1$, $R^1$—NHC(O)NH—($R^3$)—NHC(O)—$R^1$, or a combination thereof, at a first temperature, which is from about 5° C. to about 15° C. above the melting point of the polymer; and cooling the polymer at a second temperature, which is from about the glass transition temperature of the polymer to about the melting point of the compound, wherein each $R^1$ is independently $C_6$-$C_{30}$ alkyl; each $R^2$ is independently H or $C_1$-$C_{20}$ alkyl; and each $R^3$ is independently $C_2$-$C_{10}$ alkylene.

In one embodiment, the compound is ($C_6$-$C_{30}$ alkyl)C(O)NH$_2$.

In one embodiment, the amount of the compound is sufficient to promote crystallization of the polymer.

In one embodiment, the first temperature is from about 100° C. to about 190° C.

In one embodiment, the second temperature is from about 50° C. to about 90° C.

In one embodiment, the cooling occurs for a time of from about 3 to about 30 seconds. In another embodiment, the cooling occurs for a time of from about 8 to about 20 seconds.

In one embodiment, the admixing comprises melt blending, solution blending, dry mixing, extrusion mixing, injection molding, pelletizing, blow molding, extrusion sheet forming, inflation forming, contour extrusion forming, vacuum pressure forming, blown film processing, extrusion coating, fiber spinning, or a combination thereof.

In one embodiment, the polymer comprises at least about 50 mol % of hydroxyalkanoate repeat units. In another embodiment, the repeat units are 3-hydroxyalkanoate repeat units. In yet another embodiment, the repeat units are D-3-hydroxyalkanoate repeat units. In another embodiment, the repeat units are 3-hydroxybutyrate repeat units. In another embodiment, the repeat units are D-3-hydroxybutyrate repeat units. In one embodiment, the repeat units are 4-hydroxyalkanoate repeat units. In another embodiment, the repeat units are D-4-hydroxyalkanoate repeat units. In another embodiment, the repeat units are 3-hydroxyalkanoate and 4-hydroxyalkanoate repeat units.

In one embodiment, the polymer has a melting point of from about 80° C. to about 160° C. In another embodiment, the polymer has a melting point of from about 100° C. to about 150° C.

In one embodiment, the polymer has a glass transition temperature of from about −30° C. to about 10° C.

In one embodiment, the compound has a melting point of from about 60° C. to about 150° C. In another embodiment, the compound has a melting point of from about 100° C. to about 120° C.

In one embodiment, the polymer is other than poly(lactic acid), poly(glycolic acid), or a copolymer thereof.

In one embodiment, the compound has the formula $CH_3(CH_2)_{20}C(O)NH_2$ whose chemical name is "behenamide". In another embodiment, the compound is $CH_3—(CH_2)_8—C(O)NH—CH_2—CH_2—NHC(O)—(CH_2)_8—CH_3$ or $CH_3—(CH_2)_{17}—NHC(O)NH—(CH_2—CH_2)_3—NHC(O)NH—(CH_2)_{17}—CH_3$.

In one embodiment, the amount of the compound is the amount that is sufficient to promote crystallization of the polymer. In another embodiment, the amount is from about 0.01% to about 20% by weight of the polymer. In another embodiment, the amount of the compound is about 0.5% to about 5% by weight of the polymer. In one embodiment, the amount of the compound is from about 0.5% to about 1.5%, alternatively from about 2% to about 3% by weight of the polymer.

In one embodiment, at least 90% of the polymer's repeat units are hydroxyalkanoate repeat units. In another embodiment, at least 95% of the polymer's repeat units are hydroxyalkanoate repeat units. In one embodiment, at least 98% of the polymer's repeat units are hydroxyalkanoate repeat units. In another embodiment, the polymer is a hydroxybutyrate-hydroxyhexanoate copolymer. In one embodiment, the hydroxybutyrate-hydroxyhexanoate copolymer is a D-3-hydroxybutyrate-D-3-hydroxyhexanoate copolymer. In another embodiment, the hydroxyalkanoate is a D-hydroxyalkanoate. In one embodiment, the hydroxyalkanoate is a 4-hydroxyalkanoate. In another embodiment, the hydroxyalkanoate is a D-4-hydroxyalkanoate. In another embodiment, the hydroxyalkanoate is a 3-hydroxyalkanoate and 4-hydroxyalkanoate copolymer.

In one embodiment, the molecular weight of the polymer is from about 10,000 to about 3,000,000. In another embodiment, the molecular weight of the polymer is from about 300,000 to about 1,000,000.

In one embodiment, the polymer has a purity of at least about 90%. In another embodiment, the polymer has a purity of at least about 95%. In one embodiment, the polymer has a purity of at least about 98%.

In one embodiment, the first temperature is from about 130° C. to about 190° C.; the second temperature is from about 50° C. to about 90° C.; and the polymer has a first repeat unit having the structure:

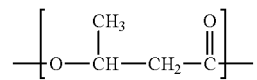

and a second repeat unit having the structure:

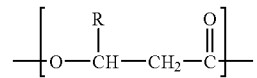

wherein each R is independently a $C_2$ to $C_{19}$ alkyl group; wherein the polymer has from about 75 mol % to about 99 mol % of the first repeat unit and from about 1 mol % to about 25 mol % of the second repeat unit. In one embodiment, each R is independently n-propyl, n-pentyl, n-heptyl, or n-nonyl.

The present invention also relates to a composition comprising a polymer having at least about 20 mole percent of hydroxyalkanoate repeat units, and a compound of the formula $R^1—C(O)N(R^2)_2$, $R^1—C(O)NH—(R^3)—NHC(O)—R^1$, $R^1—NHC(O)NH—(R^3)—NHC(O)NH—R^1$, $R^1—NHC(O)—R^2$, $R^1—NHC(O)—(R^3)—C(O)NH—R^1$, $R^1—C(O)NH—(R^3)—C(O)NH—R^1$, $R^1—NHC(O)—(R^3)—C(O)NH—R^1$, $R^1—NHC(O)NH—(R^3)—NHC(O)—R^1$, or a combination thereof. In another embodiment, the compound is of the formula $(C_6-C_{30}$ alkyl$)C(O)NH_2$.

In one embodiment, the amount of the compound is sufficient to promote crystallization of the polymer.

In one embodiment, the polymer comprises at least about 50 mol % of hydroxyalkanoate repeat units. In another embodiment, the repeat units are 3-hydroxyalkanoate repeat units. In yet another embodiment, the repeat units are D-3-hydroxyalkanoate repeat units. In another embodiment, the repeat units are 3-hydroxybutyrate repeat units. In another embodiment, the repeat units are D-3-hydroxybutyrate repeat units. In one embodiment, the repeat units are 4-hydroxyalkanoate repeat units. In another embodiment, the repeat units are D-4-hydroxyalkanoate repeat units. In another embodiment, the repeat units are 3-hydroxyalkanoate and 4-hydroxyalkanoate repeat units.

In one embodiment, the polymer has a melting point of from about 80° C. to about 160° C. In another embodiment, the polymer has a melting point of from about 100° C. to about 150° C.

In one embodiment, the polymer has a glass transition temperature of from about −30° C. to about 10° C.

In one embodiment, the compound has a melting point of from about 60° C. to about 150° C. In another embodiment, the compound has a melting point of from about 100° C. to about 120° C.

In one embodiment, the polymer is other than poly(lactic acid), poly(glycolic acid), or a copolymer thereof.

In one embodiment, the compound is behenamide. In another embodiment, the compound is CH$_3$—(CH$_2$)$_8$—C(O)NH—CH$_2$—CH$_2$—NHC(O)—(CH$_2$)$_8$—CH$_3$ or CH$_3$—(CH$_2$)$_{17}$—NHC(O)NH—(CH$_2$—CH$_2$)$_3$—NHC(O)NH—(CH$_2$)$_{17}$—CH$_3$.

In one embodiment, the amount of the compound is the amount that is sufficient to promote crystallization of the polymer. In another embodiment, the amount is from about 0.01% to about 20% by weight of the polymer. In another embodiment, the amount of the compound is about 0.5% to about 5% by weight of the polymer. In one embodiment, the amount of the compound is from about 0.5% to about 1.5%, alternatively from about 2% to about 3% by weight of the polymer.

In one embodiment, at least 90% of the polymer's repeat units are hydroxyalkanoate repeat units. In another embodiment, the polymer is a hydroxybutyrate-hydroxyhexanoate copolymer. In one embodiment, the hydroxybutyrate-hydroxyhexanoate copolymer is a D-3-hydroxybutyrate-D-3-hydroxyhexanoate copolymer. In another embodiment, the hydroxyalkanoate is a D-hydroxyalkanoate.

In one embodiment, the molecular weight of the polymer is from about 10,000 to about 3,000,000. In another embodiment, the molecular weight of the polymer is from about 300,000 to about 1,000,000.

In one embodiment, the polymer has a purity of at least about 90%. In another embodiment, the polymer has a purity of at least about 95%. In one embodiment, the polymer has a purity of at least about 98%.

In one embodiment, the polymer is a hydroxybutyrate-hydroxyhexanoate copolymer. In another embodiment, the hydroxybutyrate-hydroxyhexanoate copolymer is a D-3-hydroxybutyrate-D-3-hydroxyhexanoate copolymer. In one embodiment, the compound is behenamide.

The processes and methods herein may also include a wide variety of other variations. The processes and methods of the present invention are described in detail hereinafter.

I. Admixing the Polymer and a Compound

In one embodiment, the present invention relates to a process for crystallizing a polymer having at least 20 mole percent of hydroxyalkanoate repeat units under selected process conditions.

a) Structurally Flexible PHAs

The polymers of the present invention have at least 20 mole percent of hydroxyalkanoate repeat units. In one embodiment, the polymers of the present invention have at least about 50 mole percent of hydroxyalkanoate repeat units. In another embodiment, at least 90% of the polymer's repeat units are hydroxyalkanoate repeat units. In one embodiment, at least 95% of the polymer's repeat units are hydroxyalkanoate repeat units. In another embodiment, at least 98% of the polymer's repeat units are hydroxyalkanoate repeat units. In one embodiment, the hydroxyalkanoate repeat units are 3-hydroxyalkanoate repeat units.

In one embodiment, the polymers of the present invention contain PHAs selected from those referred to herein as "structurally flexible" PHAs, in that the physical disruption caused by the relatively high co-monomer content or particular pendant group chain length, make them generally more ductile and more difficult to crystallize than PHAs that are characterized by having lower co-monomer content and relatively short pendant groups (see, U.S. Pat. No. 5,602,227, RE 36,548, and U.S. Pat. No. 6,077,931, assigned to Procter and Gamble; and U.S. Pat. Nos. 6,043,063 and 6,087,471, assigned to Monsanto).

In one embodiment, the PHAs useful in the present invention have a first repeat unit of the structure:

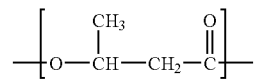

and a second repeat unit of the structure:

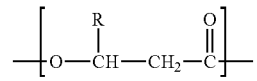

wherein each R is independently a C$_3$ to a C$_{19}$ alkyl group; wherein the polymer has from about 75 mol % to about 99 mol % of the first repeat unit, and from about 1 mol % to about 25 mol % of the second repeat unit. In one embodiment, each R is independently n-propyl, n-pentyl, n-heptyl, or n-nonyl.

The PHAs of the present invention can have a melt temperature ("Tm") of about 80° C. or higher. In one embodiment, the PHA has a melting point of from about 80° C. to about 160° C. In another embodiment, the PHA has a melting temperature of from about 80° C. to about 150° C.

In one embodiment, the hydroxyalkanoate is a 3-hydroxyalkanoate. In another embodiment, the hydroxyalkanoate is a D-3-hydroxyalkanoate. In one embodiment, the hydroxyalkanoate is a 4-hydroxyalkanoate. In another embodiment, the hydroxyalkanoate is a D-4-hydroxyalkanoate. In another embodiment, the hydroxyalkanoate is a 3-hydroxyalkanoate and 4-hydroxyalkanoate copolymer.

In one embodiment, the PHA is a hydroxybutyrate-hydroxyhexanoate copolymer. In another embodiment, the hydroxybutyrate-hydroxyhexanoate copolymer is a D-3-hydroxybutyrate-D-3-hydroxyhexanoate copolymer. In one embodiment, the hydroxybutyrate-hydroxyhexanoate copolymer comprises from about 2 mol % to about 20 mol % hydroxyhexanoate copolymer. In another embodiment, the hydroxybutyrate-hydroxyhexanoate copolymer comprises from about 5 mol % to about 15 mol % hydroxyhexanoate copolymer.

In one embodiment, the hydroxyalkanoate is a D-hydroxyalkanoate.

The present invention is applicable to PHAs covering a wide range of molecular weights. In one embodiment, the polyhydroxyalkanoate has a molecular weight of from about 100,000 to about 1,500,000. In another embodiment, the PHA has a molecular weight of from about 300,000 to about 500,000.

b) Compounds of the Formula R$^1$—C(O)N(R$^2$)$_2$, R$^1$—C(O)NH—(R$^3$)—NHC(O)—R$^1$, R$^1$—NHC(O)NH—(R$^3$)—NHC(O)NH—R$^1$, R$^1$—NHC(O)—R$^2$, R$^1$—NHC(O)—(R$^3$)—C(O)NH—R$^1$, R$^1$—C(O)NH—(R$^3$)—C(O)NH—R$^1$, R$^1$—NHC(O)NH—(R$^3$)—C(O)NH—R$^1$, R$^1$—NHC(O)NH—(R$^3$)—NHC(O)—R$^1$ Compounds of the formula R$^1$—C(O)N(R$^2$)$_2$, R$^1$—C(O)NH—(R$^3$)—NHC(O)—R$^1$, R$^1$—NHC(O)NH—(R$^3$)—NHC(O)NH—R$^1$, R$^1$—NHC(O)—R$^2$, R$^1$—NHC(O)—(R$^3$)—C(O)NH—R$^1$, R$^1$—C(O)NH—(R$^3$)—C(O)NH—R$^1$, R$^1$—NHC(O)NH—(R$^3$)—C(O)NH—R$^1$, R$^1$—NHC(O)

NH—(R³)—NHC(O)—R¹, wherein each $R^1$ is independently $C_6$-$C_{30}$ alkyl; each $R^2$ is independently H or $C_1$-$C_{20}$ alkyl; and each $R^3$ is independently $C_2$-$C_{10}$ alkylene, are useful for the present invention.

i) Exemplary Compounds

In one embodiment, the compounds are of the formula $R^1$—C(O)N($R^2$)$_2$, $R^1$—C(O)NH—($R^3$)—NHC(O)—$R^1$, $R^1$—NHC(O)NH—($R^3$)—NHC(O)NH—$R^1$, $R^1$—NHC(O)—$R^2$, $R^1$—NHC(O)—($R^3$)—C(O)NH—$R^1$, $R^1$—C(O)NH—($R^3$)—C(O)NH—$R^1$, $R^1$—NHC(O)NH—($R^3$)—C(O)NH—$R^1$, $R^1$—NHC(O)NH—($R^3$)—NHC(O)—$R^1$, wherein each $R^1$ is independently $C_6$-$C_{30}$ alkyl; each $R^2$ is independently H or $C_1$-$C_{20}$ alkyl; and each $R^3$ is independently $C_2$-$C_{10}$ alkylene.

In one embodiment, the compound is ($C_6$-$C_{30}$ alkyl)C(O)NH$_2$. In another embodiment, the compound is ($C_{16}$-$C_{22}$ alkyl)C(O)NH$_2$. In one embodiment, the compound is ($C_2$, alkyl)C(O)NH$_2$. In another embodiment, the compound is behenamide.

In one embodiment, each $R^1$ is independently $C_6$-$C_{30}$ alkyl. In one embodiment, each $R^1$ is independently $C_8$-$C_{22}$ alkyl. In another embodiment, each $R^1$ is independently $C_8$-$C_{12}$ alkyl. In one embodiment, each $R^1$ is independently $C_{16}$-$C_{22}$ alkyl. In another embodiment, each $R^1$ is $C_{21}$ alkyl. In another embodiment, each $R^1$ is $CH_3(CH_2)_{20}$.

In one embodiment, each $R^2$ is independently H or $C_1$-$C_{20}$ alkyl. In another embodiment, each $R^2$ is independently H or $C_1$-$C_6$ alkyl. In one embodiment, each $R^2$ is H.

In one embodiment, each $R^3$ is independently $C_2$-$C_{10}$ alkylene. In another embodiment, each $R^3$ is independently $C_2$-$C_6$ alkylene. In one embodiment, each $R^3$ is $C_2$ alkylene.

ii) Synthesis of Compounds

Compounds of the formula $R^1$—C(O)N($R^2$)$_2$, $R^1$—C(O)NH—($R^3$)—NHC(O)—$R^1$, $R^1$—NHC(O)NH—($R^3$)—NHC(O)NH—$R^1$, $R^1$—NHC(O)—$R^2$, $R^1$—NHC(O)—($R^3$)—C(O)NH—$R^1$, $R^1$—C(O)NH—($R^3$)—C(O)NH—$R^1$, $R^1$—NHC(O)NH—($R^3$)—C(O)NH—$R^1$, $R^1$—NHC(O)NH—($R^3$)—NHC(O)—$R^1$, wherein $R^1$, $R^2$, and $R^3$ are as described above, can be obtained commercially or synthesized using methods that are well-known to those skilled in the art.

For examples of syntheses, see, e.g., Michael B. Smith and Jerry March, *March's Advanced Organic Chemistry: Reactions, Mechanisms, and Structure*, 5$^{th}$ ed. (2001) at pp. 1652-53 (synthesis of alkyl amides, including $R_1$—C(O)N($R^2$)$_2$ and $R^1$—NHC(O)—$R^2$); pp. 1659-1660 (synthesis of bisamides, including $R^1$—C(O)NH—($R^3$)—NHC(O)—$R^1$, $R^1$—NHC(O)—($R^3$)—C(O)NH—$R^1$, and $R^1$—C(O)NH—($R^3$)—C(O)NH—$R^1$ and); or p. 1692 (synthesis of ureas, including $R^1$—NHC(O)NH—($R^3$)—NHC(O)NH—$R^1$, $R^1$—NHC(O)NH—($R^3$)—C(O)NH—$R^1$, and $R^1$—NHC(O)NH—($R^3$)—NHC(O)—$R^1$).

As another example, compounds of the formula ($C_6$-$C_{30}$ alkyl)C(O)NH$_2$ can be obtained from Croda under the trademark Incroslip.

iii) Compounds as Nucleating Agents

Compounds of the formula ($C_6$-$C_{30}$ alkyl)C(O)NH$_2$, including behenamide, are known in the art as "slip agents," which are normally used to decrease the coefficient of friction of a molded article. Slip agents can act by segregating to the surface and lowering its coefficient of friction. Surprisingly, according to the present invention, applicants believe that these compounds, as well as compounds of the formula $R^1$—C(O)N($R^2$)$_2$, $R^1$—C(O)NH—($R^3$)—NHC(O)—$R^1$, $R^1$—NHC(O)NH—($R^3$)—NHC(O)NH—$R^1$, $R^1$—NHC(O)—$R^2$, $R^1$—NHC(O)—($R^3$)—C(O)NH—$R^1$, $R^1$—C(O)NH—($R^3$)—C(O)NH—$R^1$, $R^1$—NHC(O)NH—($R^3$)—C(O)NH—$R^1$, $R^1$—NHC(O)NH—($R^3$)—NHC(O)—$R^1$, wherein $R^1$, $R^2$, and $R^3$ are as described above, are useful as a nucleating agent for PHAs. In one embodiment, the compounds of the formula $R^1$—C(O)N($R^2$)$_2$, $R^1$—C(O)NH—($R^3$)—NHC(O)—$R^1$, $R^1$—NHC(O)NH—($R^3$)—NHC(O)NH—$R^1$, $R^1$—NHC(O)—$R^2$, $R^1$—NHC(O)—($R^3$)—C(O)NH—$R^1$, $R^1$—C(O)NH—($R^3$)—C(O)NH—$R^1$, $R^1$—NHC(O)NH—($R^3$)—C(O)NH—$R^1$, $R^1$—NHC(O)NH—($R^3$)—NHC(O)—$R^1$, wherein $R^1$, $R^2$, and $R^3$ are as described above decrease the crystallization process time when blended with PHAs.

Polyhydroxyalkanoates can be difficult to nucleate, and nucleating agents can be very specific to the type of polymer being nucleated. In one embodiment, the nucleating agents' efficacy depends upon their ability to create an energetically favored surface on which new polymer crystals can form, which in turn can depend on the crystal structure of the polymer to be nucleated.

Applicants believe that compounds of the formula $R^1$—C(O)N($R^2$)$_2$, $R^1$—C(O)NH—($R^3$)—NHC(O)—$R^1$, $R^1$—NHC(O)NH—($R^3$)—NHC(O)NH—$R^1$, $R^1$—NHC(O)—$R^1$, $R^1$—NHC(O)—($R^3$)—C(O)NH—$R^1$, $R^1$—C(O)NH—($R^3$)—C(O)NH—$R^1$, $R^1$—NHC(O)NH—($R^3$)—C(O)NH—$R^1$, $R^1$—NHC(O)NH—($R^3$)—NHC(O)—$R^1$, wherein $R^1$, $R^2$, and $R^3$ are as described above, having a particular melting point profile are efficient nucleating agents for PHAs. In one embodiment, the compound has a melting point in the range of from about 60° C. to about 150° C. In another embodiment, the compound has a melting point in the range of from about 100° C. to about 120° C.

In one embodiment, the compound is of the formula ($C_6$-$C_{30}$ alkyl)C(O)NH$_2$. In one embodiment, the compound is behenamide. In another embodiment, the compound is $CH_3$—($CH_2$)$_8$—C(O)NH—$CH_2$—$CH_2$—NHC(O)—($CH_2$)$_8$—$CH_3$ or $CH_3$—($CH_2$)$_{17}$—NHC(O)NH—($CH_2$—$CH_2$)$_3$—NHC(O)NH—($CH_2$)$_{17}$—$CH_3$.

In one embodiment, the amount of compound useful in the present methods or compositions is from about 0.01% to about 20% by weight of the polymer. In another embodiment, the amount of compound is from about 0.5% to about 5% by weight of the polymer. In another embodiment, the amount of compound is from about 0.5% to about 1.5%, alternatively from about 2% to about 3% by weight of the polymer.

In one embodiment, the compounds useful in the present invention may be used in processes where very fine or thin product is required. Without wishing to be bound by theory, applicants believe that this is because compounds of the formula $R^1$—C(O)N($R^2$)$_2$, $R^1$—C(O)NH—($R^3$)—NHC(O)—$R^1$, $R^1$—NHC(O)NH—($R^3$)—NHC(O)NH—$R^1$, $R^1$—NHC(O)—$R^2$, $R^1$—NHC(O)—($R^3$)—C(O)NH—$R^1$, $R^1$—C(O)NH—($R^3$)—C(O)NH—$R^1$, $R^1$—NHC(O)NH—($R^3$)—C(O)NH—$R^1$, $R^1$—NHC(O)NH—($R^3$)—NHC(O)—$R^1$, wherein $R^1$, $R^2$, and $R^3$ are as described above, including compounds of the formula ($C_6$-$C_{30}$ alkyl)C(O)NH$_2$, such as behenamide, are molten at the PHA processing temperatures, while other nucleating agents such as boron nitride are granular and do not melt. Known nucleating agents that are granular have the potential to clog very small spinneret holes, and can cause weakness in the fibrous polymer formed.

In another embodiment, the compounds that are useful in the present invention do not introduce significant color to the resultant crystallized polymer.

Another advantage of the compounds useful in the present invention is that they can offer process temperature flexibility. For example, the compounds are useful for polymer-process temperatures near or above 180° C., which might compromise the nucleating efficiency of other nucleating agents, such as higher melting PHAs that nucleate lower melting PHAs. Process temperatures near 180° C. are useful, for example, for the crystallization of polyhydroxybutyrate-polyhydroxyvalerate, which can have a melting temperature of about 170° C.

Further, the compounds used in the present invention do not require special blending methods when contacted with the polymers to be crystallized. Any standard melt mixing method known in the art may be used. This is in contrast to certain nucleating agents known in the art, which require a plasticizer in order to be incorporated into the polymer. The use of a plasticizer can compromise the mechanical properties of the resultant polymer.

Optionally, the compound can be contacted with the polymer by standard melt mixing methods including melt blending, solution blending, dry mixing, extrusion mixing, injection molding, pelletizing, blow molding, extrusion sheet forming, inflation forming, contour extrusion forming, vacuum pressure forming, blown film processing, extrusion coating, fiber spinning, or any combination thereof. In one embodiment, mixing the compound with the polymer will disperse the compound throughout the polymer. In one embodiment, incorporating the compound into the polymer does not change the melting point of the polymer.

In one embodiment, the compound may be selected (or milled to desirable size from a larger particles size) such that the particle size of the compound is similar in size to that of the polymer. Without being limited by theory, it is believed that where the particle size of the compound and polymer are similar, that better dispersion and corresponding better crystallization of the polymer results. An example of milling technology useful herein is a pin mill.

c) Temperature

In the present invention, a polymer is contacted with a compound of the formula $R^1$—C(O)N($R^2$)$_2$, $R^1$—C(O)NH—($R^3$)—NHC(O)—$R^1$, $R^1$—NHC(O)NH—($R^3$)—NHC(O)NH—$R^1$, $R^1$—NHC(O)—$R^2$, $R^1$—NHC(O)—($R^3$)—C(O)NH—$R^1$, $R^1$—C(O)NH—($R^3$)—C(O)NH—$R^1$, $R^1$—NHC(O)NH—($R^3$)—C(O)NH—$R^1$, $R^1$—NHC(O)NH—($R^3$)—NHC(O)—$R^1$, wherein $R^1$, $R^2$, and $R^3$ are as described above at a first temperature, which is from about 5° C. to about 15° C. above the melting point of the polymer.

At a temperature that is about 5° C. to about 15° C. above the melting point of the polymer, the majority of the polymer will be molten. This will allow uniform crystallization throughout the polymer material.

In one embodiment, the first temperature is from about 100° C. to about 190° C. In another embodiment, the first temperature is from about 130° C. to about 190° C. In one embodiment, the first temperature is from about 140° C. to about 180° C.

In one embodiment, the polymer has a melting point of from about 80° C. to about 160° C. In another embodiment, the polymer has a melting point of from about 100° C. to about 150° C. One of skill in the art will recognize that the melting point of a polymer can largely be a function of the repeat units of the polymer, and can be determined by methods known to those of skill in the art.

II. Cooling the Polymer at a Second Temperature

Subsequently, the polymer is cooled at a second temperature, which is from about the glass transition temperature of the polymer to about the melting point of the compound. In one embodiment, the second temperature is from about 1° C. below the melting point of the compound to about 5° C.

Between about the glass transition temperature of the polymer and about the melting point of the compound, the rate at which a polymer crystal can grow from a primary heterogeneous nucleation site can change, and can have a maximum crystallization rate at a particular temperature that depends on the composition of the polymer. This temperature is known to those of skill in the art as the "maximum linear growth rate" temperature. Conducting crystallization at or near this temperature can provide faster crystallization speeds. In one embodiment, the compound has a melting point at or above the temperature of maximum linear growth rate.

In one embodiment, the cooling occurs for a time of from about 3 to about 30 seconds. In another embodiment, the cooling occurs for a time of from about 8 to about 20 seconds. The cooling time can be such that no significant tackiness remains in the polymer and that the mechanical integrity of the polymer is maintained. One of skill in the art will recognize that the cooling time can also depend on the second temperature at which the polymer is cooled.

In one embodiment, the second temperature is from about 50° C. to about 90° C.

In one embodiment, the polymer has a glass transition temperature of from about −30° C. to about 10° C. One of skill in the art will recognize that the glass transition temperature of a polymer can depend on the nature of the repeat units of the polymer, and can be determined by methods known to those of skill in the art.

In one embodiment, the compound has a melting point of from about 100° C. to about 120° C.

The cooling times provided by the present invention can allow for faster crystallization and therefore faster overall processing of the polymer. These advantages can make the process of the present invention more economically feasible than other crystallization processes that are known in the art.

In certain processes the time required to crystallize the polymer is an important feature of the processing. For example, when making polymer films it is advantageous that the polymer material solidify before contacting the film roll. Accelerating the cooling rate and therefore the crystallization process is advantageous for the manufacture of particular polymers, including films and fibers.

Crystallization of the polymer helps maintain the mechanical integrity of the polymer. Polymers that remain molten can deform, or have undesirable tackiness. For example, a polymer surface should be crystalline to prevent various polymer surfaces from sticking together.

III. Sources of Polymer

The polymer to be crystallized by the present invention has at least about 20 mole percent of hydroxyalkanoate repeat units. One of skill in the art will appreciate that polymers obtained or extracted by any available method can be crystallized using the crystallization methods of the present invention.

a) PHA-Containing Biomass

PHAs can be extracted from sources including, but not limited to, single-celled organisms, such as bacteria or fungi, and higher organisms, such as plants. These sources, together with the PHAs that are biosynthesized, are collectively referred to herein as "biomass". While biomass can comprise wild-type organisms, they also can comprise genetically engineered species specifically designed for the production of particular PHAs of interest to the grower. Methods for making such genetically engineered organisms are well-known to those skilled in the art.

The biomass containing the PHAs useful herein can be substantially dry. As used herein, "substantially dry" means containing less than about 5% water. Substantially dry biomass can be obtained using processes including, but not limited to, spray or freeze drying, before the extraction process is initiated. In one embodiment, a substantially dry biomass contains less than about 2% water; in another embodiment, less than 1% water, alternatively, the biomass contains no detectable level of water.

Plants useful as biomass organisms include any genetically engineered plant designed to produce PHAs. Such plants include agricultural crops such as cereal grains, oilseeds and tuber plants; other plants include avocado, barley, beet, broad bean, buckwheat, carrot, coconut, copra, corn (maize), cottonseed, gourd, lentil, lima bean, millet, mung bean, oat, oilpalm, pea, peanut, potato, pumpkin, rapeseed (e.g., canola), rice, sorghum, soybean, sugarbeet, sugar cane, sunflower, sweet potato, tobacco, wheat, and yam. Such genetically altered fruit-bearing plants useful in the process of the present invention include, but are not limited to, apple, apricot, banana, cantaloupe, cherry, grape, kumquat, tangerine, tomato, and watermelon. The plants can be genetically engineered to produce PHAs pursuant to the methods disclosed in Poirier, Y., D. E. Dennis, K. Klomparens and C. Somerville, "Polyhydroxybutyrate, a biodegradable thermoplastic, produced in transgenic plants" SCIENCE, Vol. 256, pp. 520-523 (1992); and/or U.S. Pat. No. 5,650,555 to Michigan State University, issued Jul. 22, 1997. In one embodiment, the plants are soybean, potato, corn, or coconut plants that are genetically engineered to produce PHAs; in another embodiment, the plant is soybean.

Bacteria that are useful in the present invention include any genetically engineered bacteria that can produce PHAs, as well as bacteria which naturally produce PHAs. Examples of such bacteria include those disclosed in NOVEL BIODEGRADABLE MICROBIAL POLYMERS, E. A. Dawes, ed., NATO ASI Series, Series E: Applied Sciences—Vol. 186, Kluwer Academic Publishers (1990); U.S. Pat. No. 5,292,860 to Kanegafuchi Kagaku Kogyo Kabushiki Kaisha, issued Mar. 8, 1994. In one embodiment, the bacterium is *Alcaligenes eutrophus, Escherichia coli, Ralstonia eutropha, Protomonas extorquens, Methylobacterium extorquens, Pseudomonas putida, Pseudomonas resinovorans, Pseudomonas oleovorans, Pseudomonas aeruginosa, Pseudomonas syringae, Pseudomonas fluorescens, Sphaerotilus natans, Agrobacterium, Rhodobacter sphaeroides, Actinobacillus,* or *Azotobacter vinelandii.*

In one embodiment, the biomass contains a quantity of PHA that is sufficient to make the extraction process described in the present invention economically feasible. In another embodiment, the amount of PHAs in the biomass should be at least about 20% of the total dry weight of the biomass; alternatively at least 50%; alternatively, at least about 60%. In one embodiment, the initial amount of PHA in the biomass is from about 25% to about 90% of the total dry weight.

b) Extraction:

One or more types of PHAs can be extracted from the biomass.

During the extraction, the biomass is combined with a solvent. For example, details regarding the conditions for extracting PHAs from a biomass are available in U.S. Pat. Nos. 5,942,597, 5,918,747, 5,899,339, 5,849,854, and 5,821,299, each assigned to Procter and Gamble. One of skill in the art will appreciate that PHAs obtained or extracted by any available method may be crystallized using the crystallization methods of the present invention.

c) Purity

In one embodiment, the polymers useful in the present methods and compositions are at least about 90% pure. Optionally, the polymers are at least about 95% pure, or at least about 98% pure.

Although great care has been taken herein to provide guidance as to the selection of such parameters, one of skill will recognize that the optimal range of unit operating conditions or individual devices can vary according to the type of biomass.

Therefore, the following examples further describe and demonstrate some embodiments within the scope of the present invention. The examples are given solely for the purpose of illustration, and are not to be construed as limitations of the present invention since many variations of the present invention are possible without departing from its spirit and scope.

EXAMPLES

Nucleation Results Using Peel and Ball Tests

To obtain nucleation results, a "peel test" is performed. In the peel test, 0.75-1.0 grams of a polymer sample are melted between two sheets of poly(tetrafluoroethylene) (10 mils thickness), at a temperature of 170° C. in a Carver Press. The press conditions are as follows: 2 minutes with no load, 2 minutes at 1000 lb, 2 minutes at 5000 lbs, and finally 1 minute at 10,000 lbs. The polymer sheets are removed from the press, allowed to cool for 10 seconds at a specific crystallization temperature, and pulled apart. For those sheets that can be peeled apart by hand, the polymer passes the peel test if the polymer can be peeled off both poly(tetrafluoroethylene) sheets with no deformation of the polymer.

If a particular polymer passes the peel test, then a second, "ball test" is immediately performed on the polymer. In the ball test, the polymer sheet is crumpled by hand into a ball, held for 3 seconds and then released. If the polymer sheet does not stick to itself, it is said to pass the ball test. The ball test is used to detect low levels of tackiness in the polymer.

Example 1

Melt Blended PHA with Behenamide

Poly(3-hydroxybutyrate-co-3-hexanoate) ("PHB-Hx") having 5 mol % hexanoate (Mw=680,000) are melt blended with refined behenamide (about 95% pure), sold under the trademark Incroslip B (Croda). The PHA and behenamide are combined in a Haake Rheocord 90 melt mixer at 1% by weight behenamide (0.5 g Incroslip B to 49.5 g PHB-Hx). The combination is mixed at 170° C. at 60 rpm for ten minutes, removed and left overnight.

The resultant PHB-Hx/behenamide blend sample are then subjected to a peel test using a crystallization temperature of 60° C. and a ball test. The blend passes both tests.

As a control, PHB-Hx are prepared as above but without the added behenamide. The control PHB-Hx fails the peel and ball tests outlined above.

Additional PHB-Hx samples are prepared as above, but using varying amounts of behenamide. PHB-Hx samples are prepared in the presence of 2% by weight, 3% by weight, 5% by weight, and 10% by weight of behenamide. Each of these PHB-Hx/behenamide blends passes the peel and ball tests outlined above.

Further PHB-Hx samples are prepared as set forth above, but using varying mole percentages of hexanoate copolymer in the presence of 2% by weight of behenamide. PHB-Hx samples containing 6.2 mol % hexanoate copolymer, 8.5 mol % hexanoate copolymer, and 9.4 mol % hexanoate copolymer are prepared. Each of these PHB-Hx/behenamide blends passes the peel and ball tests outlined above.

Example 2

Melt Blended PHA with Behenamide

Poly(3-hydroxybutyrate-co-3-hexanoate) (PHB-Hx) having 5 mol % hexanoate (Mw=680,000) is melt blended as described in Example 2, above, but in the presence of 2% by weight behenamide, sold under the trademark Incroslip BR (Croda).

The sample passes the peel and ball tests outlined above.

Example 3

Injection Molded PHA with Behenamide

Poly(3-hydroxybutyrate-co-3-hexanoate) (PHB-Hx) having 6.2 mol % hexanoate (Mw=660,000) is melt blended with refined behenamide (about 95% pure), sold under the trademark Incroslip B (Croda). The blends (both powders) are dry mixed at room temperature in 50 g batches at 2% by weight behemamide (1.0 g behenamide to 49.0 grams of PHB-Hx) to give a total of 5 kg of mixed powder. The powder is then charged to a Henschel mixer, and the powder is dry blended for 4 minutes at 1000 rpm. The powder blend is then fed into a Haake Rheocord 90 twin screw extruder. Extruder conditions are 120 rpm with zone temperatures set at 165° C., 170° C., 175° C. with a die temp of 170°. The extruded strand passes through a water bath at 60° C. The strand is then chopped into pellets using a Berlin PEL2 pelletizer.

To demonstrate nucleation, these pellets are then injected molded into dogbone test pieces using an Engels 60-ton injection molder. The conditions of the injection molding are: Extruder temperature is 300° F./300° F./300° F./300° F. (nozzle). The mold temperature is set at 140° F. The injection speed is 4 inches per second, with a screw stroke of 0.9 inches. Back pressure is 51 psi and a sprue break in the profile. To demonstrate nucleation, the length of time in the mold after filling that is required to produce solid test pieces that would automatically eject from the mold when the mold is pulled apart is measured.

For the PHB-Hx behenamide blend, the cool time, which is the time after the mold is filled, is 9 seconds.

For the PHB-Hx that is prepared in similar manner but without behenamide, the cool time is greater than 300 seconds. Cool time is proportional to crystallization time. In general, a longer cool time demonstrates slower crystallization.

Example 4

Melt Mixed PHA Crystallization Temperature

Compositions are prepared by melt mixing 100 parts by weight of poly(3-hydroxybutyrate-co-3-hexanoate) ("PHB-Hx") having 4.2 mol % hexanoate (Mw=1,220,000) with 2 parts per weight of additive A, B, or C below. Compositions are melt mixed for 4 minutes and vacuum-degassed for 1 minute while subjected to a screw rotation of 100 rpm. The mixer chamber temperature is set to 155-160° C.

Additive A is behenamide that is obtained a product of Nippon Kasei Chemical.

Additive B is the compound:

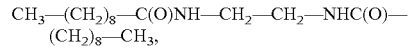

which is available under the trade name Slipax C10 from Nippon Kasei Chemical. This compound has a melting temperature of 162-170° C.

Additive C is the compound:

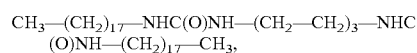

which is available under the trade name Hakleen SH from Nippon Kasei Chemical. This compound has a melting temperature of 174-175° C.

A comparative example is also prepared without any additive.

The effect on crystallinity of PHB-Hx is evaluated by measuring the polymer's $T_{cc}$, which is the crystallization temperature during cooling. $T_{cc}$ is measured using Differential Scanning Calorimeter (DSC), and is provided in Table 1 below. Samples are molten at 180° C. and quenched in an ice bath prior to DSC measurement. In the DSC measurement, the temperature is raised from 0° C. to 200° C. by 10° C. per minute and then lowered from 200° C. to 0° C. by 10° C. per minute. The results in Table 1 demonstrate that Additives A, B, and C are effective nucleating agents for PHAs.

TABLE 1

| | $T_{cc}$ of Composition | | | |
|---|---|---|---|---|
| | Additive A | Additive B | Additive C | Comparative (No Additive) |
| $T_{cc}$ (° C.) | 69.8 | 58.5 | 61.0 | None |

Example 5

Pelletizing PHA with Behenamide

Poly(3-hydroxybutyrate-co-3-hexanoate) (PHB-Hx) having 5.7 mol % hexanoate (Mw=590,000) is melt blended with refined behenamide (about 95% pure), sold under the trademark Incroslip-B (Croda). The behenamide is first milled into a fine powder using a pin mill or high-intensity mixer with chopping ability, in order to reduce the behenamide particle size and match the PHB-Hx neat polymer particle size. In the first mixing step, 0.5 lbs of milled behenamide are dry mixed for 4 minutes at low speed with 9.5 lbs of neat PHB-Hx in a Henschel high intensity mixer (5% by weight behenamide). In the second and final dry mixing step, 40 lbs of additional PHB-Hx neat polymer is added to the mixture from the first step creating a 50 lb batch at 1% by weight behenamide (0.5 lbs behenamide to 49.5 lbs of PHB-Hx). The combined blend is mixed for an additional 4 minutes at low speed in the Henschel mixer. This milling and dry mixing process maximizes behenamide dispersion in PHB-Hx prior to melt compounding and pelletizing, in order to achieve efficient nucleation and crystallization at low behenamide levels.

The final blend with 1% behenamide is then fed into a 46 mm Coperion Buss Kneader (single-screw mixing extruder) at 30 lb/hr to melt and further homogenize the materials. The melt blend is conveyed from the Buss Kneader directly into a single discharge screw which forces the melt through a die for strand pelletization. Table 2 below contains the screw conditions, temperature settings, and measured melt temperature profile in the extrusion process. The die has 3 holes, each with a diameter of 4 mm. The extruded strands pass through a 9 ft water bath at 60° C. to complete crystallization. The average residence time in the bath is 30 seconds. The strands are then cut into pellets with a chopper.

TABLE 2

Extruder Conditions

| Buss Kneader Screw Conditions | | | Heating Zone Temperature Settings | | | | | Melt Temperatures In Buss Kneader | | | | | | |
|---|---|---|---|---|---|---|---|---|---|---|---|---|---|---|
| | | | BK | BK | BK | Discharge | | | | | | | | |
| Speed RPM | Power KW | % Torque | Screw °C. | Zone 1 °C. | Zone 2 °C. | Screw °C. | Die °C. | $T_{m1}$ °C. | $T_{m2}$ °C. | $T_{m3}$ °C. | $T_{m4}$ °C. | $T_{m5}$ °C. | $T_{m6}$ °C. | $T_{m7}$ °C. |
| 160 | 3.1 | 23 | 130 | 130 | 130 | 135 | 155 | 124 | 125 | 137 | 142 | 142 | 142 | 150 |

(BK = Buss Kneader)

Throughout this application, various publications are referenced. The disclosures of these publications in their entireties are hereby incorporated by reference into this application in order to more fully describe the state of the art as known to those skilled therein as of the date of the invention described and claimed herein.

The disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A process for crystallizing a polymer that is copolymer of a first repeat units which has a structure:

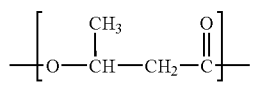

and a second repeat unit that has a structure:

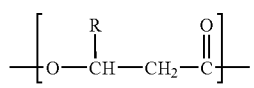

in which R is independently a $C_3$ to $C_{19}$ alkyl group, the polyomer having at least 20 mole percent of hydroxyalkanoate repeat units, comprising a) admixing the polymer and a compound of the formula:

$R^1$—C(O)N($R^2$)$_2$, $R^1$—C(O)NH—($R^3$)—NHC(O)—$R^1$, $R^1$—NHC(O)NH—($R^3$)—NHC(O)NH—$R^1$, $R^1$—NHC(O)—$R^2$, $R^1$—NHC(O)—($R^3$)—C(O)NH—$R^1$, $R^1$—C(O)NH—($R^3$)—C(O)NH—$R^1$, $R^1$—NHC(O)NH—($R^3$)—C(O)NH—$R^1$, $R^1$—NHC(O)NH—($R^3$)—NHC(O)—$R^1$, or a combination thereof at a first temperature, which is from about 5° C. to about 15° C. above the melting point of the polymer; and b) cooling the polymer at a second temperature, which is from about the glass transition temperature of the polymer to about the melting point of the compound; wherein each $R^1$ is independently $C_6$-$C_{30}$ alkyl;

each $R^2$ is $C_1$-$C_{20}$ alkyl; and each $R^3$ is independently $C_2$-$C_{10}$ alkylene.

2. The process of claim 1, wherein the compound is ($C_6$-$C_{30}$ alkyl)C(O)NH$_2$.

3. The process of claim 1, wherein the first temperature is from about 100° C. to about 190° C.

4. The process of claim 1, wherein the second temperature is from about 50° C. to about 90° C.

5. The process of claim 1, wherein the cooling occurs for a time of from about 3 to about 30 seconds.

6. The process of claim 1, wherein the admixing comprises melt blending, solution blending, dry mixing, extrusion mixing, injection molding, pelleting, blow molding, extrusion sheet forming, inflation forming, contour extrusion forming, vacuum pressure forming, blown film processing, extrusion coating, fiber spinning, or a combination thereof.

7. The process of claim 1, wherein the polymer comprises at least about 50 mol % hydroxyalkanoate repeat units.

8. The process of claim 7, wherein the repeat units are 3-hydroxybutyrate repeat units.

9. The process of claim 1, wherein the polymer has a melting point of from about 80° C. to about 160° C.

10. The process of claim 1, wherein the polymer has a glass transition temperature of from about −30° C. to about 10° C.

11. The process of claim 1, wherein the compound has a melting point of from about 60° C. to about 150° C.

12. A process for crystallizing a polymer that is copolymer of a first repeat unit which has a structure:

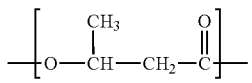

and a second repeat unit has a structure:

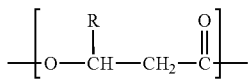

in which R is independently a $C_3$ to $C_{19}$ alkyl group, the polymer having at least 20 mole percent of hydroxyalkanoate repeat units, comprising
a) admixing the polymer and wherein the compound is behenamide; and
b) cooling the polymer at a second temperature, which is from about the glass transition temperature of the polymer to about the melting point of the behenamide.

13. The process of claim 1, wherein the compound is $CH_3$—$(CH_2)_8$—$C(O)NH$—$CH_2$—$CH_2$—$NHC(O)$—$(CH_2$—$)_8$—$CH_3$ or $CH_3$—$(CH_2)_{17}$—$NHC(O)NH$—$(CH_2$—$CH_2)_3$—$NHC(O)NH$—$(CH_2)_{17}$—$CH3$.

14. The process of claim 1, wherein the amount of the compound is about 0.01% to about 20% by weight of the polymer.

15. The process of claim 1, wherein the amount of the compound is about 0.5% to about 1.5% by weight of the polymer.

16. The process of claim 1, wherein the particle size of the polymer and of the compound are similar.

17. The process of claim 1, wherein at least 90% of the polymer's repeat units are hydroxyalkanoate repeat units.

18. The process of claim 17, wherein the polymer is a hydroxybutyrate-hydroxyhexanoate copolymer.

19. The process of claim 17, wherein the hydroxyalkanoate is a D-hydroxyalkanoate.

20. The process of claim 17, wherein the molecular weight of the polymer is from about 300,000 to about 1,000,000.

21. The process of claim 17, wherein the polymer has a purity of at least about 90%.

22. The process of claim 1, wherein
a) the first temperature is from about 130° C. to about 190° C.;
b) the second temperature is from about 50° C. to about 90° C.; and
c) the polymer has a first repeat unit having the structure:

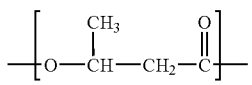

and a second repeat unit having the structure:

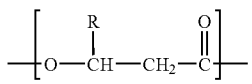

wherein each R is independently a $C_3$ to $C_{19}$ alkyl group; wherein the polymer has from about 75 mol % to about 99 mol % of the first repeat unit and from about 1 mol % to about 25 mol % of the second repeat unit.

23. A composition comprising: a) a polymer that is copolymer of a first repeat unit which has a structure:

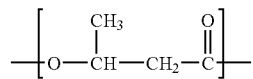

and a second repeat unit having the structure:

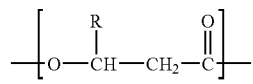

in which R is independently a $C_3$ to $C_{19}$ alkyl group, the polymer having at least 20 mole percent of hydroxyalkanoate repeat units, and b) a compound of the formula $R^1$—$C(O)N(R^2)_2$, $R^1$—$C(O)NH$—$(R^3)$—$NHC(O)$—$R^1$, $R^1$—$NHC(O)NH$—$(R^3)$—$NHC(O)NH$—$R^1$, $R^1$—$NHC(O)$—$R^2$, $R^1$—$NHC(O)$—$(R^3)$—$C(O)NH$—$R^1$, $R^1$—$C(O)NH$—$(R^3)$—$C(O)NH$—$R^1$, $R^1$—$NHC(O)NH$—$(R^3)$—$C(O)NH$—$R^1$, $R^1$—$NHC(O)NH$—$(R^3)$—$NHC(O)$—$R^1$, or a combination thereof; wherein each $R^1$ is independently $C_6$-$C_{30}$ alkyl; each $R^2$ is $C_1$-$C_{20}$ alkyl; and each $R^3$ is independently $C_2$-$C_{10}$ alkylene.

24. The composition of claim 23, wherein the compound is $(C_6$-$C_{30}$ alkyl$)C(O)NH_2$.

25. The composition of claim 23, wherein the polymer is a hydroxybutyrate-hydroxyhexanoate copolymer.

26. The composition of claim 25, wherein the hydroxybutyrate-hydroxyhexanoate copolymer is a D-3-hydroxybutyrate-D-3-hydroxyhexanoate copolymer.

27. A composition comprising: a) a polymer that is copolymer of a first repeat unit which has a structure:

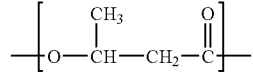

and a second repeat unit that has a structure:

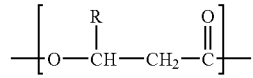

in which R is independently a $C_3$ to $C_{19}$ alkyl group, the polymer having at least 20 mole percent of hydroxyalkanoate repeat units, and b) behenamide.

28. The composition of claim 23, wherein the polymer has a first repeat unit having the structure:

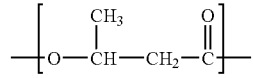

and a second repeat unit having the structure:

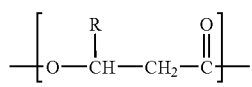

wherein each R is independently a $C_3$ to $C_{19}$ alkyl group; wherein the polymer has from about 75 mol % to about 99 mol % of the first repeat unit and from about 1 mol % to about 25 mol % of the second repeat unit.

29. The composition of claim 23, the polymer has a melting point of from about 80° C. to about 160° C.

30. The composition of claim 24, wherein the polymer has a glass transition temperature of from about −30° C. to about 10° C.

31. The composition of claim 23, wherein the compound has a melting point of from about 60° C. to about 150° C.

32. The composition of claim 23, wherein the compound is $CH_3$—$(CH_2)_8$—$C(O)NH$—$CH_2$—$CH_2$—$NHC(O)$—$(CH_2)_8$—$CH_3$ or $CH_3$—$(CH_2)_{17}$—$NHC(O)NH$—$(CH_2$—$CH_2)_3$—$NHC(O)NH$—$(CH_2)_{17}$—$CH_3$.

33. The composition of claim 23, wherein the amount of the compound is about 0.01% to about 20% by weight of the polymer.

34. The composition of claim 23, wherein the molecular weight of the polymer is from about 300,000 to about 1,000,000.

* * * * *